(12) United States Patent
Harmon et al.

(10) Patent No.: US 12,207,577 B2
(45) Date of Patent: Jan. 28, 2025

(54) SYSTEM AND METHOD FOR IDENTIFYING A FAILED SHEAR PIN OF A GROUND-ENGAGING SYSTEM OF AN AGRICULTURAL IMPLEMENT

(71) Applicant: CNH Industrial America LLC, New Holland, PA (US)

(72) Inventors: Joshua David Harmon, White Salmon, WA (US); Craig Pavlich, Glen Ellyn, IL (US); Brittany Schroeder, Lowell, IN (US)

(73) Assignee: CNH Industrial America LLC, New Holland, PA (US)

( * ) Notice: Subject to any disclaimer, the term of this patent is extended or adjusted under 35 U.S.C. 154(b) by 486 days.

(21) Appl. No.: 17/224,672

(22) Filed: Apr. 7, 2021

(65) Prior Publication Data
US 2022/0322597 A1 Oct. 13, 2022

(51) Int. Cl.
*A01B 61/04* (2006.01)
(52) U.S. Cl.
CPC .......... *A01B 61/042* (2013.01); *A01B 61/044* (2013.01)
(58) Field of Classification Search
CPC ............................. A01B 61/042; A01B 61/044
USPC ........................................................ 172/271
See application file for complete search history.

(56) References Cited

U.S. PATENT DOCUMENTS

| | | | | |
|---|---|---|---|---|
| 518,013 A * | 4/1894 | Thayer | ................. | A01K 97/125 43/17 |
| 1,394,651 A * | 10/1921 | Tompkins | .............. | A01B 51/00 172/26 |
| 3,221,705 A * | 12/1965 | Saviskas | ................ | A01K 97/12 43/17 |
| 3,958,752 A * | 5/1976 | Pieszchala | ........... | A47G 29/121 232/35 |
| 4,057,112 A * | 11/1977 | Taylor | .................... | A01B 13/08 172/699 |
| 7,546,815 B2 * | 6/2009 | Mazzei et al. | .......... | B63B 45/04 116/303 |
| 9,485,900 B2 * | 11/2016 | Connell et al. | ........ | A01B 63/24 |
| 2017/0196160 A1 * | 7/2017 | Bjerketvedt et al. | .. | A01B 15/02 |
| 2020/0305336 A1 * | 10/2020 | Harmon | ................. | A01B 76/00 |
| 2020/0390023 A1 * | 12/2020 | Harmon et al. | ....... | A01B 71/02 |
| 2021/0132573 A1 * | 5/2021 | Sporrer et al. | ....... | A01B 79/005 |
| 2021/0134090 A1 * | 5/2021 | Sporrer et al. | ........... | B60Q 9/00 |

\* cited by examiner

*Primary Examiner* — Thomas B Will
*Assistant Examiner* — Joel F. Mitchell
(74) *Attorney, Agent, or Firm* — Rebecca Henkel; Peter K. Zacharias; Rickard K. DeMille (57) ABSTRACT

A system for identifying a failed shear pin of a ground-engaging system of an agricultural implement may include a ground-engaging system having an attachment structure coupled to a frame of an agricultural implement, a ground-engaging tool pivotably coupled to the attachment structure at a pivot joint, and a shear pin at least partially extending through the attachment structure and the ground-engaging tool to prevent pivoting of the ground-engaging tool about the pivot joint. The system may further include an operator notification member provided in association with the ground-engaging system and movable between a non-triggered position and a triggered position. Additionally, the system may include a linkage that, upon failure of the shear pin, allows the operator notification member to be moved from the non-triggered position to the triggered position.

18 Claims, 6 Drawing Sheets

SYSTEM AND METHOD FOR IDENTIFYING A FAILED SHEAR PIN OF A GROUND-ENGAGING SYSTEM OF AN AGRICULTURAL IMPLEMENT

FIELD OF THE INVENTION

The present disclosure relates generally to agricultural implements and, more particularly, to systems and methods for identifying a failed shear pin of a ground-engaging system of an agricultural implement.

BACKGROUND OF THE INVENTION

It is well known that, to attain the best agricultural performance from a field, a farmer must cultivate the soil, typically by performing a tillage operation. Modern farmers perform tillage operations by pulling a tillage implement behind an agricultural work vehicle, such as a tractor. Tillage implements typically include a plurality of ground-engaging tools configured to penetrate the soil to a particular depth. In this respect, the ground-engaging tools may be pivotably coupled to a frame of the tillage implement. In many instances, biasing elements, such as springs, are used to exert biasing forces on the ground-engaging tools. This configuration may allow the ground-engaging tools to be biased towards a desired position relative to the frame, thereby maintaining the particular depth of soil penetration as the agricultural work vehicle pulls the tillage implement through the field. Additionally, this configuration may also permit the ground-engaging tools to pivot out of the way of rocks or other impediments in the soil, thereby preventing damage to the ground-engaging tools or other components on the implement.

In addition to such biasing elements, tillage implements often utilize a shear-bolt mounting arrangement in which shear pins or bolts are used to couple the ground-engaging tools to the frame or associated attachment structure. In such an embodiment, the shear pins serve to protect the ground-engaging tools from excessive loading that would otherwise substantially damage or break the tools. For instance, the shear pins may break when the adjustability provided by the associated biasing element is insufficient, which allows a ground-engaging tool to pivot out of the way of rocks or other impediments in the soil and prevent the ground-engaging tool from damage.

When a shear pin breaks during the performance of an agricultural operation, the associated ground-engaging tool will no longer be capable of effectively working the soil. However, with current implement configurations, it is often very difficult for the operator to determine when one or more of the shear pins have failed. As such, an extensive portion of the field may have been worked before discovering the broken shear pin(s), which negatively affects subsequent field operations and, ultimately, yields.

Accordingly, a system and method for identifying a failed shear pin of a ground-engaging system of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for identifying a failed shear pin of a ground-engaging system of an agricultural implement. The system may include a ground-engaging system having an attachment structure coupled to a frame of an agricultural implement, a ground-engaging tool pivotably coupled to the attachment structure at a pivot joint, and a shear pin at least partially extending through the attachment structure and the ground-engaging tool to prevent pivoting of the ground-engaging tool about the pivot joint. The system may further include an operator notification member provided in association with the ground-engaging system, the operator notification member being movable between a non-triggered position and a triggered position. Additionally, the system may include a linkage provided in association with the operator notification member such that, upon failure of the shear pin, the linkage allows the operator notification member to be moved from the non-triggered position to the triggered position.

In another aspect, the present subject matter is directed to a shank assembly of an agricultural implement including an attachment structure coupled to a frame of an agricultural implement, a shank pivotably coupled to the attachment structure at a pivot joint, and a shear pin at least partially extending through the attachment structure and the shank to prevent pivoting of the shank about the pivot joint. The shank assembly may further include an operator notification member movable relative to the attachment structure, the operator notification member being movable between a non-triggered position and a triggered position. Additionally, the shank assembly may include a linkage provided in association with the operator notification member such that, upon failure of the shear pin, the linkage allows the operator notification member to be moved from the non-triggered position to the triggered position.

In an additional aspect, the present subject matter is directed to a method for identifying a failed shear pin of a ground-engaging system of an agricultural implement. The ground engaging system may have an attachment structure configured to be coupled to a frame of the agricultural implement, a ground-engaging tool pivotably coupled to the attachment structure at a pivot joint, and a shear pin at least partially extending through the attachment structure and the ground-engaging tool. The method may include receiving, with one or more computing devices, data from at least one sensor, where the data is indicative of a position of an operator notification member provided in association with the ground-engaging system, and where the operator notification member is movable from a non-triggered position to a triggered position when the shear pin fails. The method may further include determining, with the one or more computing devices, the position of the operator notification member based at least in part on the data indicative of the position of the operator notification member. Additionally, the method may include controlling, with the one or more computing devices, an operation of the agricultural implement based at least in part on the position of the operator notification member.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for identifying a failed shear pin of a ground-engaging system of an agricultural implement. Specifically, in several embodiments, the disclosed system may be used to identify a shear bolt or pin of a ground-engaging system that has failed, where the shear pin, before failing, prevents a ground-engaging tool, such as a shank, from pivoting about a pivot joint relative to a frame of an agricultural implement during normal operation of the ground engaging system. For instance, the disclosed system may include an operator notification member, such as a flag, a sign, etc., that is movable between a non-triggered position and a triggered position, where the operator notification member is moved from the non-triggered position to the triggered position when the shear pin breaks or fails. The operator notification member is generally more visible when in the triggered position than when in the non-triggered position such that an operator can easily identify that the associated shear pin is broken. For instance, in some embodiments, the operator notification member is positioned vertically higher when in the triggered position than when in the non-triggered position. In some embodiments, a controller may be configured to determine the position of the operator notification member based at least in part on data indicative of a position of the operator notification member from one or more sensor(s). Based on the determined position of the operator notification member, the controller may indicate the position of the operator notification member (or status of the associated shear bolt). For instance, the controller may control an operation of a user interface to display to an operator that the operator notification member is in the triggered position (and/or that the associated shear bolt has failed) and/or slow down/stop the implement. As such, the disclosed system and method allow a failed shear pin to be identified more easily, which improves the overall tillage operation.

Figure 1:
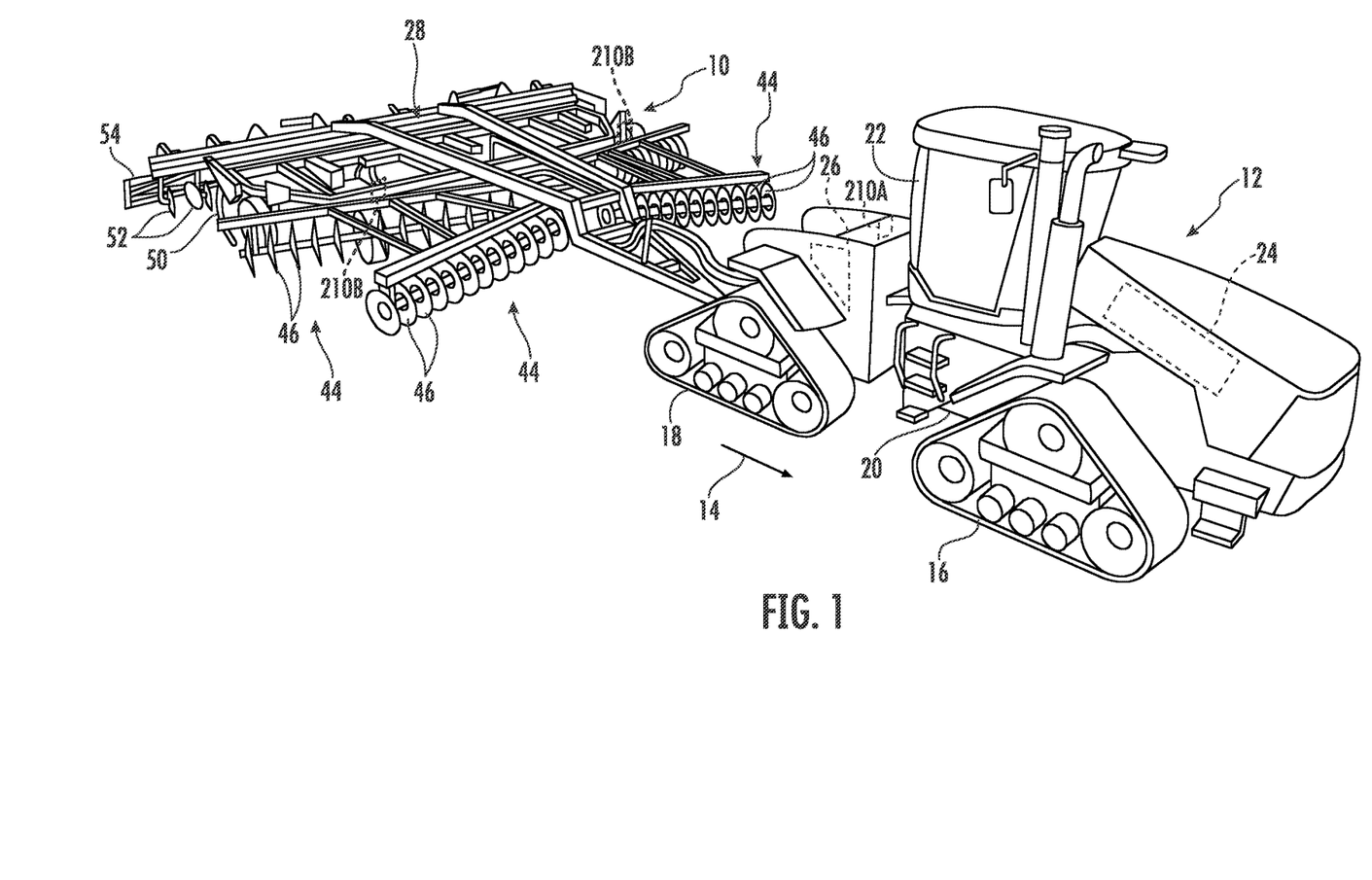
FIG. 1 illustrates a perspective view of one embodiment of an agricultural implement coupled to a work vehicle in accordance with aspects of the present subject matter.
Figure 2:
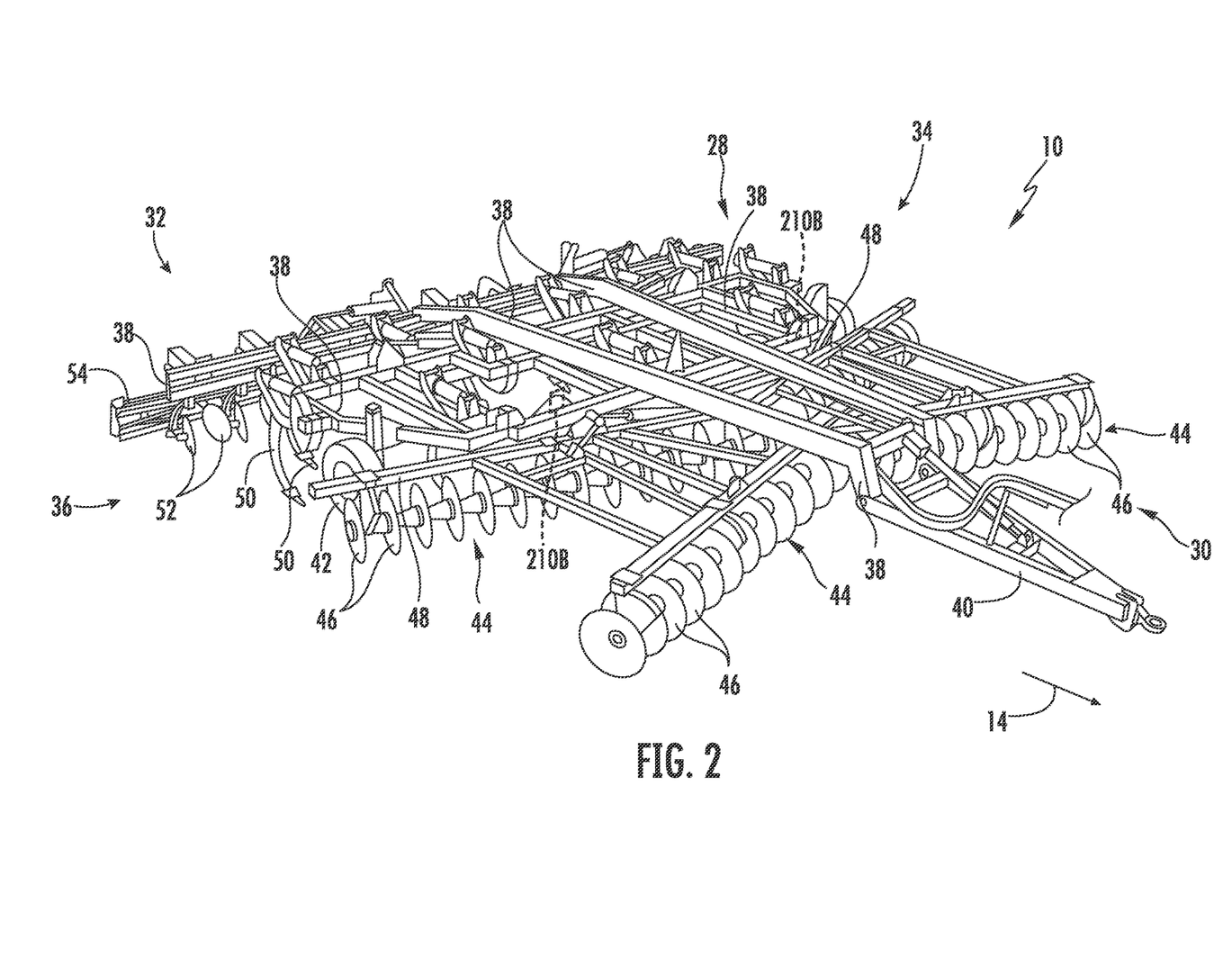
FIG. 2 illustrates another perspective view of the agricultural implement shown in FIG. 1 in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown particularly in FIG. 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one of which is shown in FIG. 2) may be coupled to the frame 28 to facilitate towing the implement 10 in the direction of travel 14.

In several embodiments, one or more ground-engaging tools may be coupled to and/or supported by the frame 28. More particularly, in certain embodiments, the ground-engaging tools may include one or more shanks 50 and/or one or more disc blades 46 supported relative to the frame 28. In one embodiment, each shank 50 and/or disc blade 46 may be individually supported relative to the frame 28. Alternatively, one or more groups or sections of the ground-engaging tools may be ganged together to form one or more ganged tool assemblies, such as the disc gang assemblies 44 shown in FIGS. 1 and 2.

As illustrated in FIG. 2, each disc gang assembly 44 includes a toolbar 48 coupled to the implement frame 28 and a plurality of disc blades 46 supported by the toolbar 48 relative to the implement frame 28. Each disc blade 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil.

It should be appreciated that, in addition to the shanks 50 and the disc blades 46, the implement frame 28 may be configured to support any other suitable ground-engaging tools. For instance, in the illustrated embodiment, the frame 28 is also configured to support a plurality of leveling blades 52 and rolling (or crumbler) basket assemblies 54. In other embodiments, any other suitable ground-engaging tools may be coupled to and supported by the implement frame 28.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 12, and/or rely on tires/wheels in lieu of the track assemblies 16, 18.

Figure 3:
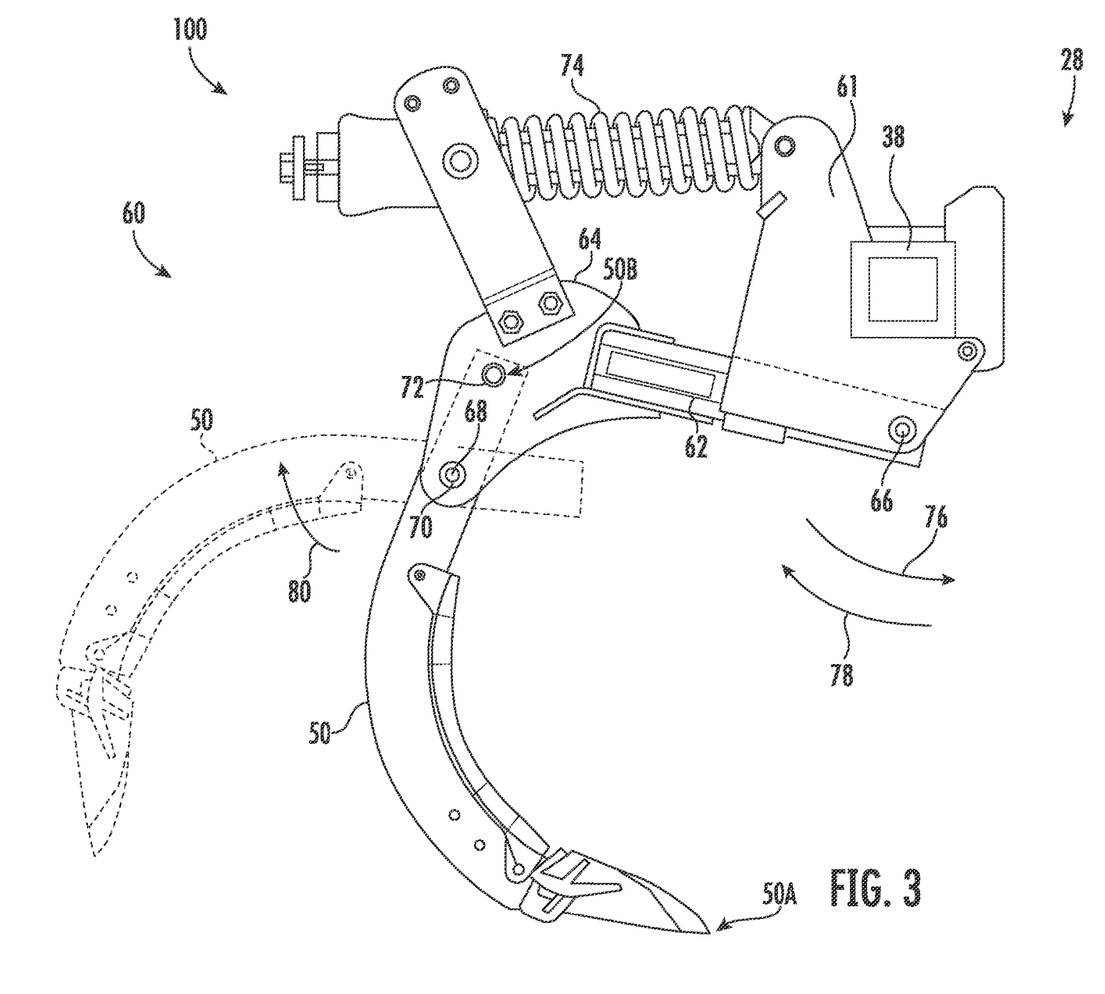
FIG. 3 illustrates a side view of one embodiment of a shank assembly including a shank pivotably coupled to an implement frame in accordance with aspects of the present subject matter, particularly illustrating a shear pin extending through the shank.

Referring now to FIG. 3, a side-view of a shank assembly 100 including one of the shanks 50 of the tillage implement 10 described above with reference to FIGS. 1 and 2 is illustrated in accordance with aspects of the present subject matter. As shown in the illustrated embodiment, the shank assembly 100 includes the shank 50 and an associated attachment structure 60 for pivotably coupling the shank 50 to the implement frame 28 (e.g., about a first pivot point 66). More particularly, the attachment structure 60 includes a first attachment member 61, a second attachment member 62, and a third attachment member 64. The first attachment member 61 is fixed to the implement frame 28 (e.g., to frame member 38). A first end of the second attachment member 62 is pivotably coupled to the first attachment member 61 at the first pivot joint 66. The third attachment member 64 is fixed to a second end of the second attachment member 62.

The shank 50 extends between a proximal or tip end 50A and a distal end 50B, with the shank 50 being pivotably coupled to the attachment structure 60 (e.g., to the third attachment member 64) of the shank assembly 100 at a second pivot point 68 proximate the distal end 50B. For instance, the shank 50 may be coupled to the third attachment member 64 via an associated pivot member 70 (e.g., a support pivot bolt or pin, hereinafter referred to as "the support pin 70") extending through both the shank 50 and the attachment member 64 at the second pivot point 68. As such, the shank 50 may pivot about the second pivot point 68 relative to the frame 28 independent of the pivoting about the first pivot point 66.

Further, as shown in FIG. 3, the shank assembly 100 may include a shear bolt or pin 72 (hereinafter referred to as "the shear pin 72") for preventing pivoting of the shank 50 about the second pivot point 68 during normal operation of the tillage implement. For instance, the shear pin 72 at least partially extends through both the attachment structure 60 (e.g., through third attachment member 64) and the shank 50 at a location spaced apart from the second pivot point 68. For example, in the illustrated embodiment, the shear pin 72 is received within openings formed above the second pivot point 68 in the attachment member 64 and the shank 50. However, the shear pin 72 may be positioned at any other suitable location relative to the second pivot point 68. In one embodiment, the shear pin 72 may correspond to a mechanical pin designed such that the pin breaks when a predetermined force is applied through the pin or a certain amount of fatigue of the pin has occurred. For instance, the shear pin 72 may be designed to withstand normal or expected loading conditions for the shank 50 and fail when the loads applied through the shear pin 72 exceed or substantially exceed such normal/expected loading conditions or when the fatigue life of the shear pin 72 is reached. Particularly, the shear pin 72 may be configured to fail before other components of the shank assembly 100. More particularly, the shear pin 72 is configured to fail before the support pin 70 and the shank 50. As such, the shear pin 72 has a lower fatigue life threshold (e.g., a shorter fatigue life) than a fatigue life threshold of the support pin 70 and a fatigue life threshold of the shank 50. The shear pin 72 may similarly have other thresholds that are lower than associated thresholds of the support pin 70 and/or the shank 50, such as a lower ultimate shear strength threshold and/or the like than the support pin 70 and/or the shank 50. Accordingly, the shear pin 72 may break to protect at least the support pin 70 and/or the shank 50 from damage or failure as will be described in greater detail below.

Additionally, in several embodiments, the shank assembly 100 may include a biasing element 74 for biasing the shank 50 towards a ground-engaging tool position relative to the frame 28. In general, the shank 50 is configured to penetrate the soil to a desired depth when the shank 50 is in the ground-engaging tool position. In operation, the biasing element 74 may permit relative movement between the shank 50 and the frame 28. For example, the biasing element 74 may be configured to bias the shank 50 (and the attachment structure 60) to pivot relative to the frame 28 in a first pivot direction (e.g., as indicated by arrow 76). The biasing element 74 also allow the shank 50 (and the attachment structure 60) to pivot away from the ground-engaging tool position (e.g., to a shallower depth of penetration), such as in a second pivot direction (e.g., as indicated by arrow 78 in FIG. 3) opposite the first pivot direction 76, when encountering rocks or other impediments in the field. In the embodiment shown, the biasing element 74 is configured as a spring. It should be recognized, however, that the biasing element 74 may be configured as an actuator or any other suitable biasing element.

During normal operation, the tip end 50A of the shank 50 may encounter impediments in the field causing the shank assembly 100 to rotate about the first pivot point 66 in the second pivot direction 78. Typically, the shank 50 will pivot upwards in the second pivot direction 78 about the first pivot point 66 to clear the impediment and then will return to its home or ground-engaging position via the action of the biasing element 74. However, in certain instances, a larger amount of force than typical may be transmitted through the shank assembly 100 and/or the shear pin 72 may reach its fatigue limit. In such instances the shear pin 72 may be designed to fracture or fail, thereby allowing the shank 50 to rotate about the second pivot point 68 relative to the attachment member 64. For instance, the shank 50 may rotate about the second pivot point 68 (as indicated by arrow 80 in FIG. 3) to the shank position indicated by dashed lines in FIG. 3. As such, when the shear pin 72 has failed, the shank 50 can no longer perform the tillage operation. As indicated above, the longer an operator continues to perform the tillage operation with the broken shear pin 72, the worse the overall quality of the tillage operation.

As such, in accordance with aspects of the present subject matter, the shank assembly 100 further includes an operator notification assembly 150. For instance, referring now to FIGS. 4A and 4B, perspective views of one embodiment of an operator notification assembly for identifying a failed shear pin of a ground-engaging system of an agricultural implement. More particularly, FIG. 4A illustrates an operator notification member of the operator notification assembly in a non-triggered position and FIG. 4B illustrates the operator notification member in a triggered position.

Figure 4A:
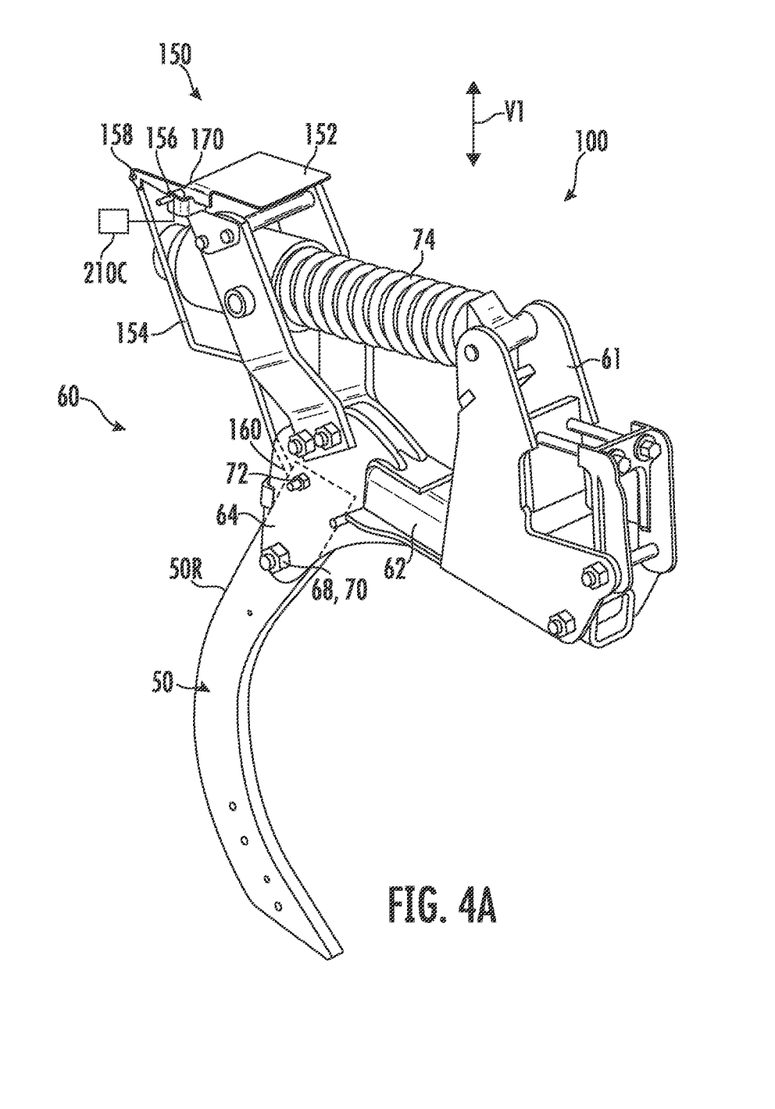
FIGS. 4A and 4B illustrate perspective views of one embodiment of an operator notification assembly for identifying a failed shear pin of a ground-engaging system of an agricultural implement in accordance with aspects of the present subject matter, particularly illustrating a flag of the assembly in a non-triggered position and in a triggered position, respectively.
Figure 4B:
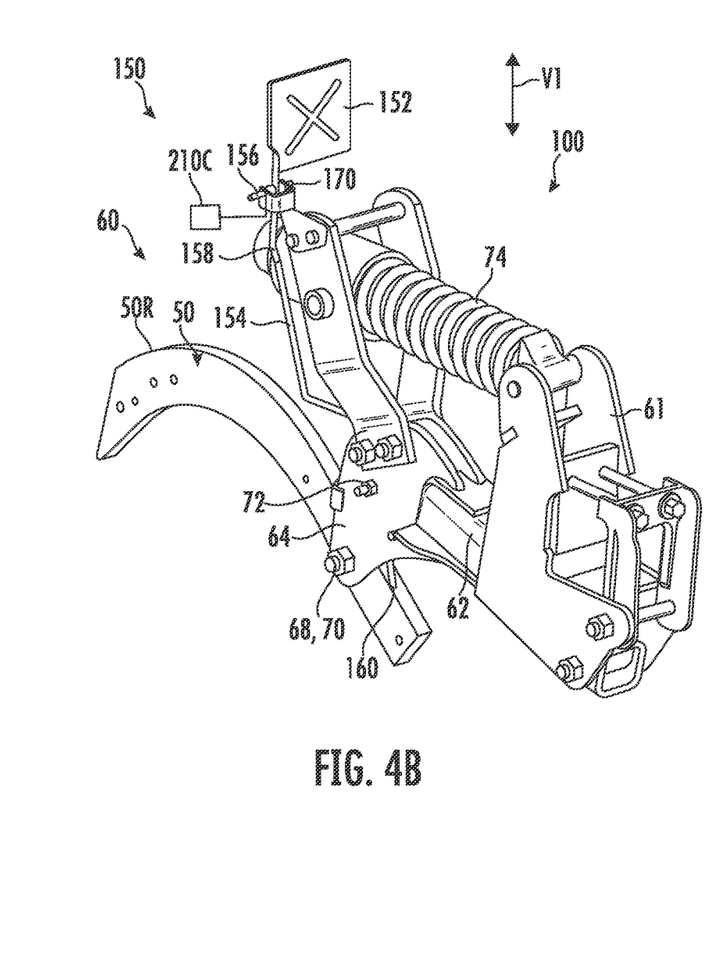

As shown in FIGS. 4A and 4B, the operator notification assembly 150 includes an operator notification member 152 and a linkage 154 configured to actuate the operator notification member 152. In general, the operator notification member 152 is in the non-triggered position shown in FIG. 4A when the shear pin 72 has not failed and, when the shear pin 72 fails, the operator notification member 152 is moved into the triggered position shown in FIG. 4B via operation of the linkage 154. When the operator notification member 152 is in the triggered position (FIG. 4B), it is more visible to an operator than when in the non-triggered position (FIG. 4A). For instance, in some embodiments, the operator notification member 152 is positioned vertically higher relative to the rest of the shank assembly 100 along a vertical direction V1 in the triggered position (FIG. 4B) than when in the non-triggered position (FIG. 4A).

More particularly, the operator notification member 152 is, in one embodiment, pivotably coupled to the attachment structure 60 (e.g., to the third attachment member 64) at a member pivot joint 156 such that the operator notification member 152 is pivotable between the non-triggered and triggered positions. The linkage 154 extends between a first end 158 and a second end 160, with the first end 158 of the linkage 154 being coupled (e.g., pivotably coupled) to the operator notification member 152. In one embodiment, the second end 160 of the linkage 154 is coupled (e.g., pivotably coupled) to the shank 50. For instance, the second end 160 of the linkage 154 may be coupled to a rear side 50R of the shank 50 above the second pivot point 68. In such embodiment, when the shear pin 72 fails, the shank 50 pivots about the second pivot point 68 (as indicated by arrow 80 in FIG. 3) due to failure of the shear pin 72. With the linkage 154 being coupled to the shank 50 above the second pivot point 68, such pivoting of the shank 50 results in the linkage 154 being pulled downwardly, which, in turn, causes the operator notification member 152 to be actuated from the non-triggered position (FIG. 4A) to the triggered position (FIG. 4B) by the movement of the linkage 154. It should be appreciated that while, in some embodiments, the second end 160 of the linkage 154 may be configured to extend between plates of the third attachment member 64 to couple to the shank 50, the second end 160 of the linkage 154 may be configured such that it does not extend between plates of the third attachment member 64 to couple to the shank 50.

Figure 5A:
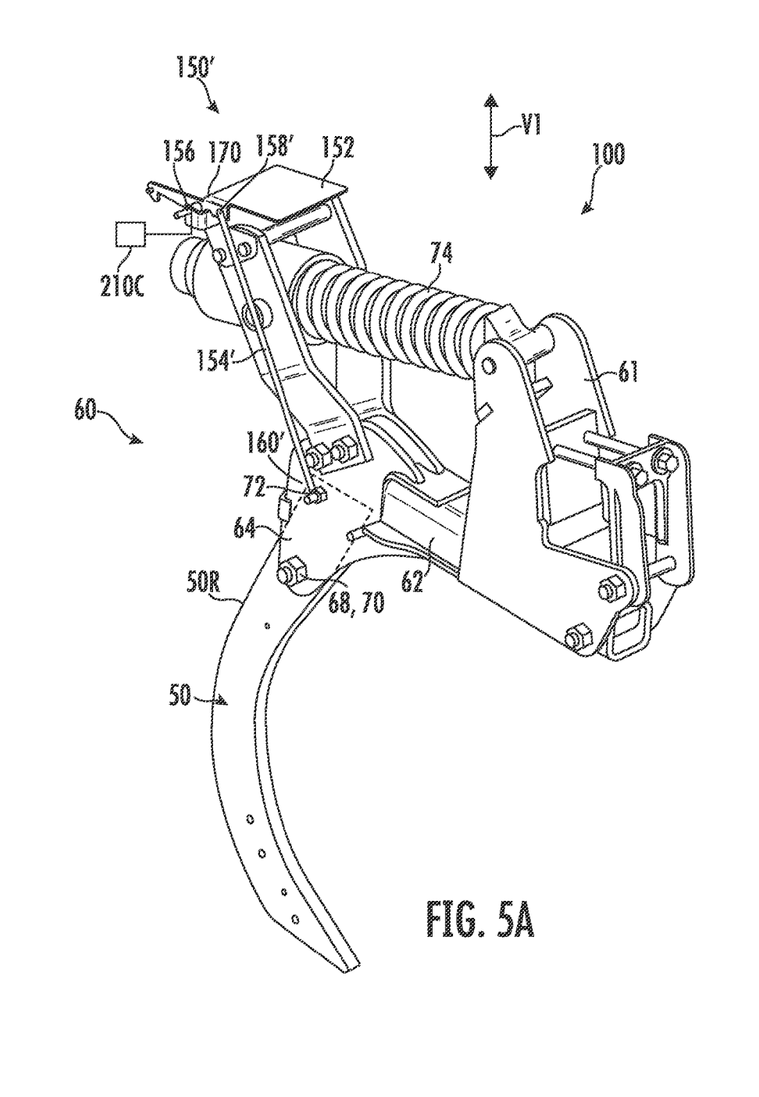
FIGS. 5A and 5B illustrate perspective views of another embodiment of an operator notification assembly for identifying a failed shear pin of a ground-engaging system of an agricultural implement in accordance with aspects of the present subject matter, particularly illustrating a flag of the assembly in a non-triggered position and in a triggered position, respectively.
Figure 5B:
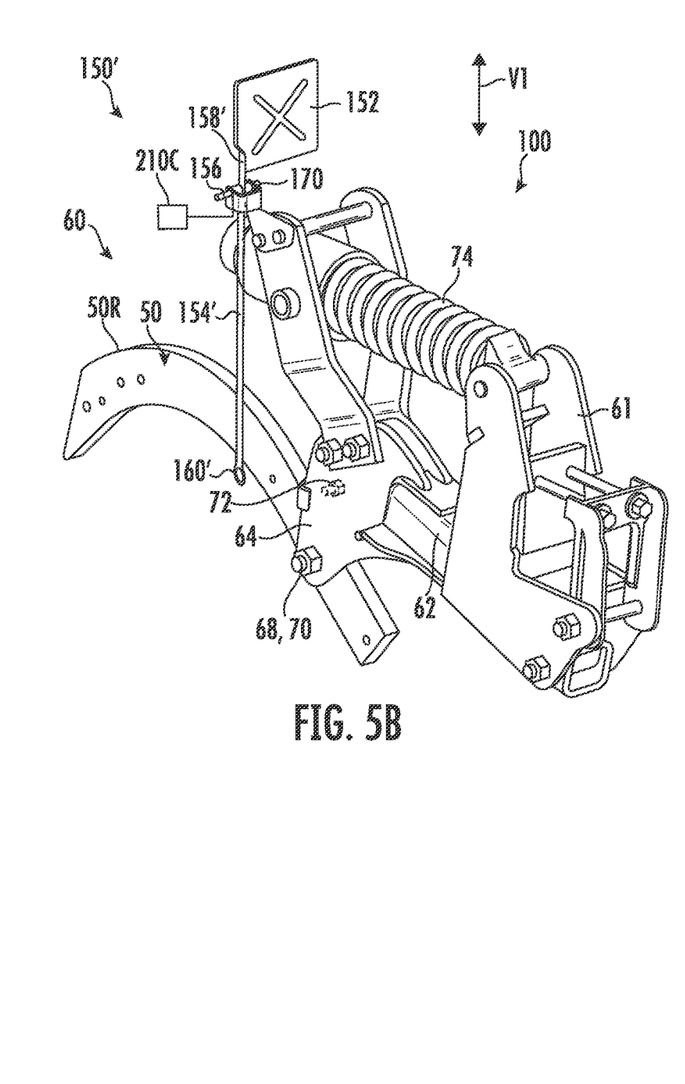

It should be appreciated that, in another embodiment, the second end of the linkage may be coupled to any other suitable part of the shank assembly 100. For instance, as shown in FIGS. 5A and 5B, perspective views of another embodiment of an operator notification assembly for identifying a failed shear pin of a ground-engaging system of an agricultural implement. More particularly, FIG. 5A illustrates an operator notification member of such operator notification assembly in a non-triggered position and FIG. 5B illustrates the operator notification member in a triggered position. The embodiment of the operator notification assembly 150' shown in FIGS. 5A and 5B is substantially the same as the embodiment of the operator notification assembly 150 shown in FIGS. 4A and 4B, except that the operator notification assembly 150' has a linkage 154' that extends between a first end 156' and a second end 158', where the first end 156' of the linkage 154' is coupled to the operator notification member 152 and where the second end 158' of the linkage 154' is coupled to a portion of the shear pin 72. For instance, the second end 158' of the linkage 154' may be received around the shear pin 72. For example, the second end 158' may form a loop or be coupled to a washer which is received around the shear pin 72. When the shear pin 72 has not failed, the linkage 154' biases the operator notification member 152 away from the triggered position (e.g., against a spring bias towards the triggered position). However, when the shear pin 72 fails, the shear pin 72 may fall out of the third attachment member 64 such that the second end 158' of the linkage 154' is no longer anchored to the third attachment member 64. Thus, the operator notification member 152 is no longer biased away from the triggered position by the linkage 154', and the operator notification member 152 is allowed to move from the non-triggered position (FIG. 5A) to the triggered position (FIG. 5B).

As indicated above, in some embodiments, the operator notification member 152 may be biased towards the triggered-position, e.g., by a spring (not shown). For instance, a spring may be coupled between the operator notification member 152 and the third attachment member 64, between the second end 158 of the linkage 154 and the third attachment member 64, and/or between any other suitable components of the shank assembly 100.

In the illustrated embodiments, the operator notification member 152 is configured as a sign. However, it should be appreciated that, in other embodiments, the operator notification member 152 may be configured as any other suitable object or combination of objects, such as a flag, and/or the like. It should further be appreciated that, while the operator notification member 152 is described as being pivotably coupled to the shank assembly 100 such that it is pivotable between the non-triggered and triggered positions, the operator notification member 152 may be coupled to the shank assembly 100 in any other suitable way such that it is movable between the non-triggered and triggered positions. For instance, the operator notification member 152 may be slidably coupled to the shank assembly 100 such that it is slidable between the non-triggered and triggered positions.

It should further be appreciated that the linkage 154, 154' may be configured as any suitable linking member or combination of linking members that couples the operator notification member 152 to the shank 50 or the shear pin 72. For instance, in the embodiment illustrated in FIGS. 4A and 4B, the linkage 154 is configured as a rod (e.g., a bent rod). However, in the embodiment illustrated in FIGS. 5A and 5B, the linkage 154' is configured as a cable, a chain, a rope, and/or the like.

Moreover, in some embodiments, the operator notification assemblies 150, 150' further include a holding mechanism 170 for holding or maintaining the operator notification member 152 at the triggered position. More particularly, the holding mechanism 170 is engaged as the operator notification member 152 moves into the triggered position, such that the operator notification member 152 cannot return back to the non-triggered position without or until an operator input is provided. As such, any swaying of the shank assembly 100, particularly of the shank 50, will not cause the operator notification member 152 to sway back and forth between the triggered and non-triggered positions such that "false-negatives" for failed shear bolts are avoided. It should be appreciated that the holding mechanism 170 may be configured as any suitable automatic or self-closing latch mechanism, bolt mechanism, catch mechanism, and/or the like.

While the operator notification members 152 associated with the shank assemblies 100 may mechanically indicate to an operator which shear pins 72 are broken, in some embodiments, as will be described in greater detail below, a controller of the disclosed system may be configured to automatically determine which of the shear pins 72 have failed based at least in part on the position of the operator notification members 152 and subsequently notify an operator of the failed shear pin(s) 72. For instance, one or more sensors 210 may be provided that generate data indicative of a position of the operator notification member 152. For example, one or more vehicle-based sensors 210A (FIG. 1) may be positioned on the work vehicle 12 (FIG. 1), one or more implement-based sensors 210B (FIGS. 1 and 2) may be positioned on the agricultural implement 10, and/or one or more assembly-based sensors 210C may be positioned on the shank assembly 100 such that the sensor(s) 210A, 210B, 210C generate data indicative of the position of the operator notification member 152 relative to the rest of the shank assembly(ies) 100. Based on the data received from the sensor(s) 210, a controller of the disclosed system may be configured to determine the position of the associated operator notification member(s) 152 and perform a control action based on the determined position to provide an operator notification of any failed shear pins 72.

It should be appreciated that the sensor(s) 210 may be configured as any suitable sensor(s). For instance, in one embodiment, the sensor(s) 210A, 210B, 210C may be configured as vision-based sensor(s), such as a camera(s), a light detection and ranging (LIDAR) device(s), and/or a radio detection and ranging (RADAR) sensor(s), having a field of view directed towards the operator notification member 152 of one or more of the shank assemblies 100. In some embodiments, the operator notification member 152 is only within the view of view of the sensor(s) 210 when the operator notification member 152 is in the triggered position. However, in other embodiments, the operator notification member 152 may be within the view of view of the sensor(s) 210 when the operator notification member 152 is in the both the non-triggered and triggered positions. In some embodiments, the assembly-based sensor(s) 210C may instead be configured as or additionally include one or more position sensors (e.g., capacitive proximity sensors, switches, and/or the like), one or more rotational sensors, one or more accelerometers, and/or the like coupled to or configured to detect the operator notification member 152 (or a lack thereof).

Figure 6:
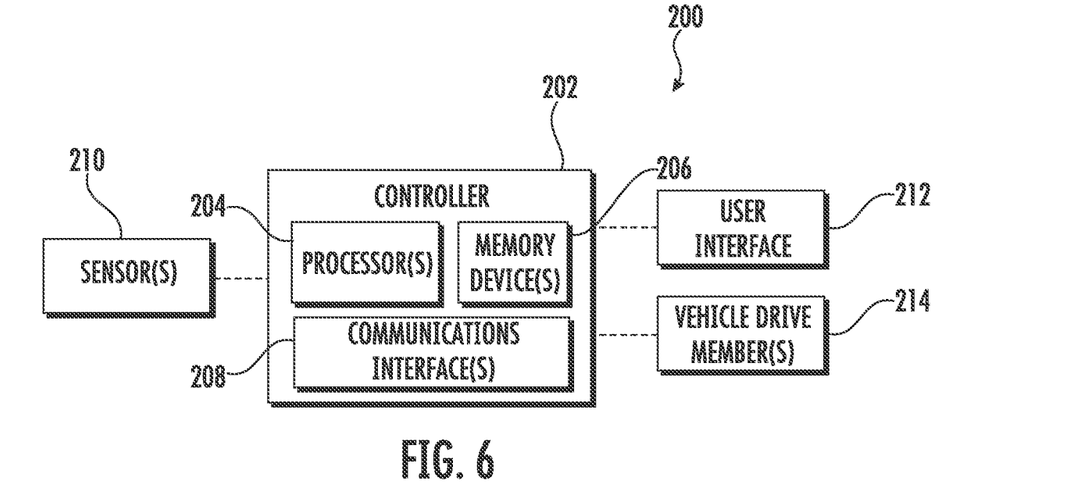
FIG. 6 illustrates a schematic view of one embodiment of a system for identifying a failed shear pin of a ground-engaging system of an agricultural implement in accordance with aspects of the present subject matter.

Referring now to FIG. 6, a schematic view of one embodiment of a system 200 for identifying a failed shear pin of a ground-engaging system of an agricultural implement is illustrated in accordance with aspects of the present subject matter. In general, the system 200 will be described herein with reference to the implement 10 described above with reference to FIGS. 1 and 2, the shank assembly 100 described above with reference to FIG. 3, and the operator notification assembly 150, 150' described above with reference to FIGS. 4A-5B. However, it should be appreciated that, in general, the disclosed system 200 may be utilized with any suitable implement having any suitable implement configuration to allow a failed shear pin of a ground-engaging system of the implement to be identified. Moreover, it should be appreciated that the disclosed system 200 may be used with any other suitable ground-engaging tool of an agricultural implement.

As shown in FIG. 6, the system 200 may include a controller 202 and various other components configured to be communicatively coupled to and/or controlled by the controller 202. For instance, the controller 202 may be communicatively coupled to the sensor(s) 210 (e.g., the sensors 210A, 210B, 210C) that generate data indicative of a position of an operator notification member 152 of the shank assembly 100. Further, the controller 202 may be communicatively coupled to and/or configured to control a user interface 212. The user interface 212 described herein may include, without limitation, any combination of input and/or output devices that allow an operator to provide inputs to the controller 202 and/or that allow the controller 202 to provide feedback to the operator, such as a keyboard, keypad, pointing device, buttons, knobs, touch sensitive screen, mobile device, audio input device, audio output device, and/or the like. Additionally, the controller 202 may be communicatively coupled to and/or configured to control one or more vehicle drive members 214, such as an engine and/or a transmission of the work vehicle 12.

In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods and algorithms that will be described herein. In addition, the controller 202 may also include various other suitable components, such as a communications circuit or module, one or more input/output channels, a data/control bus and/or the like.

It should be appreciated that, in several embodiments, the controller 202 may correspond to an existing controller of the agricultural implement 10 and/or of the work vehicle 12 to which the implement 10 is coupled. However, it should be appreciated that, in other embodiments, the controller 202 may instead correspond to a separate processing device. For instance, in one embodiment, the controller 202 may form all or part of a separate plug-in module that may be installed within the agricultural implement 10 to allow for the disclosed system and method to be implemented without requiring additional software to be uploaded onto existing control devices of the agricultural implement 10.

In some embodiments, the controller 202 may be configured to include one or more communications modules or interfaces 208 for the controller 202 to communicate with any of the various system components described herein. For instance, one or more communicative links or interfaces (e.g., one or more data buses) may be provided between the communications interface 208 and the sensor(s) 210 (e.g., the sensors 210A, 210B, 210C) to allow the controller 202 to receive data indicative of a position of the operator notification member 152 of the shank assembly 100 from the sensor(s) 210. Further, one or more communicative links or interfaces (e.g., one or more data buses) may be provided between the communications interface 208 and a user interface (e.g., user interface 212) to allow operator inputs to be received by the controller 202 and/or the allow the controller 202 to control the operation of one or more components of the user interface 212. Additionally, one or more communicative links or interfaces (e.g., one or more data buses) may be provided between the communications interface 208 and the vehicle drive member(s) 214 to allow the controller 202 to control the operation of the vehicle drive member(s) 214.

As indicated above, the controller 202 may be configured to determine a position of the operator notification member 152 of a shank assembly 100 based at least in part on data indicative of the position of the operator notification member 152 of the shank assembly 100. As such, the controller 202 may include any suitable data processing techniques, relationships, and/or algorithms within its memory 206 that, when executed by the processor 204, allow the controller 202 to determine the position of the operator notification member 152 based at least in part on the data received from the sensor(s) 210. In some embodiments, for example, the controller 202 may analyze images of the implement 10, shank assemblies 100, and/or operator notification member 152 using any suitable image processing techniques when the sensor(s) 210 include vision-based sensor(s). Suitable processing or analyzing techniques may include performing spatial analysis on received images or image data. For instance, geometric or spatial processing algorithms, shape detection and/or edge-finding or perimeter-finding algorithms, and/or the like may differentiate the shape, color, edges, and/or the like of the operator notification member 152 from the rest of the implement 10 and/or shank assemblies 100. In embodiments, where the assembly-based sensor(s) 210C are coupled to the associated operator notification member(s) 152, the controller 202 may include any suitable relationships and/or algorithms stored within its memory 206 that, when executed by the processor 204, allow the controller 202 to determine the position of the operator notification member 152 based on the data from the assembly-based sensor(s) 210C.

It should be appreciated that, in some embodiments, the controller 202 may determine the position of the operator notification member 152 based at least in part on the data received from a single sensor 210 (e.g., sensor 210A, 210B, 210C) or a combination of the sensors 210A, 210B, 210C. It should further be appreciated that the controller 202 may be configured to determine positions of the operator notification members 152 of a plurality of shank assemblies 100 of the agricultural implement 10, or that a separate controller 202 may be provided for each respective one of a plurality of shank assemblies 100 for determining the position of the associated operator notification member 152. Additionally, it should be appreciated that, in one embodiment, the controller 202 may monitor the position of the operator notification member 152 continuously or periodically.

Once the position of the operator notification member 152 is determined, in some embodiments, the controller 202 controls the operation of the user interface 212 to display or otherwise indicate the position of the operator notification member 152. Alternatively, or additionally, in some embodiments, the controller 202 may be further configured to control an operation of the agricultural implement 10 based on the position of the operator notification member 152. For instance, when the controller 202 determines that the operator notification member 152 is in the triggered position, the controller 202 determines that the associated shear pin 72 has failed, and the controller 202 performs a control action. In one embodiment, the control action includes controlling the operation of the user interface 212 to notify an operator of the agricultural implement 10 that the shear pin 72 has failed and needs to be replaced. In some embodiments, the control action additionally, or alternatively, includes controlling an operation of one or more vehicle drive components 214 configured to drive the vehicle 12 coupled to the implement 10, such as the engine and/or transmission of the vehicle 12. In such embodiments, the controller 202 may be configured to control the operation of the vehicle drive component(s) 214 to slow down the vehicle 12 and attached implement 10 or bring the vehicle 12 and implement 10 to a stop. It should be appreciated that, depending on the type of controller being used, the above-described control actions may be executed directly by the controller 202 or indirectly via communications with a separate controller (e.g., using an ISObus communications protocol).

Figure 7:
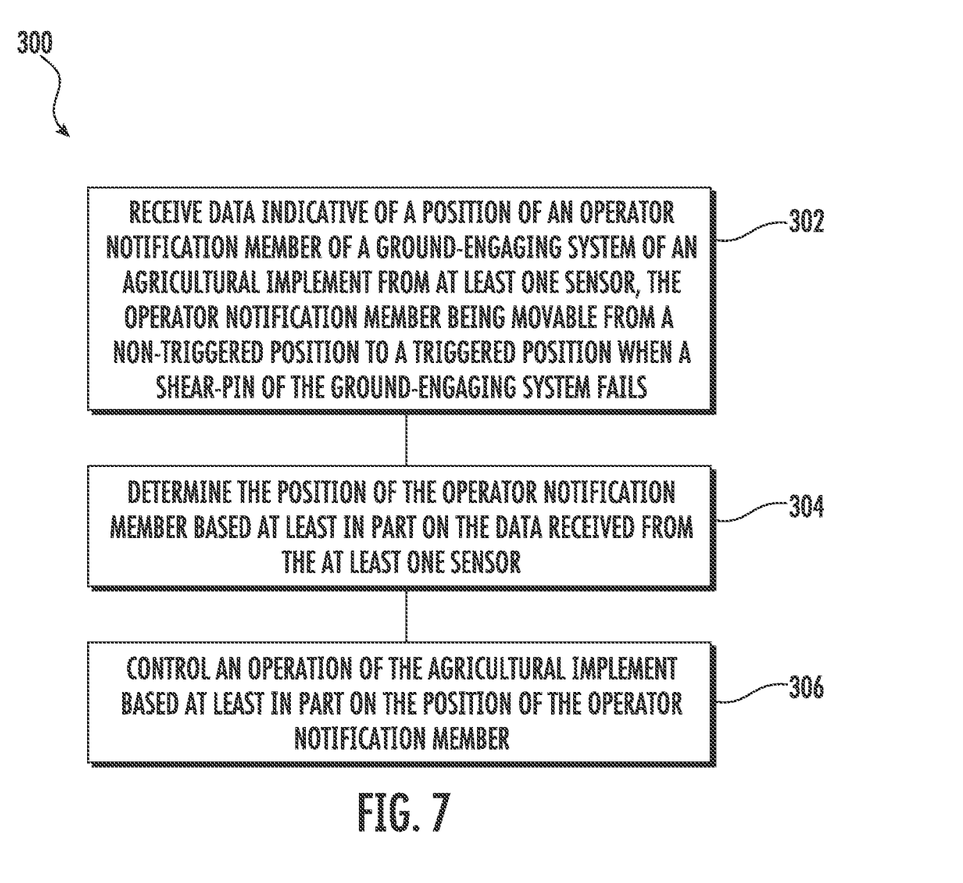
FIG. 7 illustrates a flow diagram of one embodiment of a method for identifying a failed shear pin of a ground-engaging system of an agricultural implement in accordance with aspects of the present subject matter.

Referring now to FIG. 7, a flow diagram of one embodiment of a method 300 for identifying a failed shear pin of a ground-engaging system of an agricultural implement is illustrated in accordance with aspects of the present subject matter. In general, the method 300 will be described herein with reference to the implement 10 and the work vehicle 12 shown in FIGS. 1 and 2, the shank assembly 100 described above with reference to FIG. 3, the operator notification assembly 150, 150' described with reference to FIGS. 4A-5B, and the various components of the system 200 described with reference to FIG. 6. However, it should be appreciated that the disclosed method 300 may be implemented with work vehicles and/or implements having any other suitable configurations and/or within systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 7, at (302), the method 300 may include receiving data indicative of a position of an operator notification member of a ground-engaging system of an agricultural implement from at least one sensor, the operator notification member being movable from a non-triggered position to a triggered position when a shear-pin of the ground-engaging system fails. For instance, as described above, the controller 202 may be configured to receive input(s) from one or more sensors 210 (e.g., vehicle-based sensor(s) 210A, implement-based sensor(s) 210B, and/or assembly-based sensor(s) 210C) configured to generate data indicative of a position of the operator notification member 152 of the shank assembly 100, where the operator notification member 152 is movable from a non-triggered position (FIG. 4A) to a triggered position (FIG. 4B) when a shear-pin 72 of the shank assembly 100 fails.

Further, at (304), the method 300 may include determining the position of the operator notification member based at least in part on the data received from the at least one sensor. For example, as discussed above, the controller 202 may be configured to analyze the sensor data received from the sensor(s) 210 (e.g., sensor(s) 210A, 210B, 210C) using any suitable data processing techniques to determine the position of the operator notification member 152 (e.g., whether the operator notification member 152 is in the non-triggered position or in the triggered position).

Additionally, at (306), the method 300 may include controlling an operation of the agricultural implement based at least in part on the position of the operator notification member. For instance, as described above, the controller 202 may be configured to control the operation of the user interface 212 to display the position of the operator notification member 152 and/or that the shear pin 72 associated with the operator notification member 152 needs to be replaced based on the position of the operator notification member 152. Alternatively, or additionally, the controller 202 may be configured to control the operation of one or more vehicle drive members 214 to slow down or stop the implement based on the position of the operator notification member 152. For example, the controller 202 may perform such control actions when the operator notification member 152 is in the triggered position, indicating that the associated shear pin 72 has failed.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for identifying a failed shear pin of a ground-engaging system of an agricultural implement, the system comprising:
   a ground-engaging system, comprising:
      an attachment structure coupled to a frame of an agricultural implement;
      a ground-engaging tool pivotably coupled to the attachment structure at a pivot joint; and
      a shear pin at least partially extending through the attachment structure and the ground-engaging tool to prevent pivoting of the ground-engaging tool about the pivot joint;
   an operator notification member supported on the agricultural implement, the operator notification member being movable relative to the ground-engaging tool between a non-triggered position and a triggered position, the operator notification member comprising at least one of a flag or a sign; and
   a linkage coupled to the operator notification member and to either the ground-engaging tool or a portion of the shear pin, the linkage holding the operator notification member in the non-triggered position when the shear pin has not failed, the linkage allowing the operator notification member to move from the non-triggered position to the triggered position when the shear pin fails.

2. The system of claim 1, further comprising a holding mechanism, the holding mechanism being configured to maintain the operator notification member at the triggered position.

3. The system of claim 1, wherein the operator notification member is positioned vertically higher relative to the ground-engaging system when in the triggered position than when in the non-triggered position.

4. The system of claim 1, wherein the linkage is coupled between the operator notification member and the ground-engaging tool such that the linkage actuates the operator notification member from the non-triggered position to the triggered position as the linkage is moved by the ground-engaging tool as the ground-engaging tool pivots about the pivot joint when the shear pin fails.

5. The system of claim 1, wherein the linkage is coupled proximate a first end of the linkage to the operator notification member and proximate a second end of the linkage to a portion of the shear pin, the linkage being anchored proximate the second end of the linkage to the attachment structure when the shear pin has not failed and the linkage being no longer anchored proximate the second end of the linkage to the attachment structure when the shear pin fails.

6. The system of claim 1, wherein the linkage comprises at least one of a cable, a chain, or a rod.

7. The system of claim 1, further comprising:
at least one sensor configured to generate data indicative of a position of the operator notification member; and
a controller communicatively coupled to the at least one sensor, the controller being configured to determine a position of the operator notification member based at least in part on the data from the at least one sensor.

8. The system of claim 7, wherein the at least one sensor comprises a camera having a field of view that includes the operator notification member when the operator notification member is in the triggered position.

9. The system of claim 7, wherein the controller is configured to perform a control action based at least in part on the position of the operator notification member.

10. The system of claim 1, wherein the ground-engaging tool is a shank.

11. A shank assembly of an agricultural implement, comprising:
an attachment structure coupled to a frame of an agricultural implement;
a shank pivotably coupled to the attachment structure at a pivot joint;
a shear pin at least partially extending through the attachment structure and the shank to prevent pivoting of the shank about the pivot joint;
an operator notification member movable relative to the attachment structure, the operator notification member being movable relative to the attachment structure and the shank between a non-triggered position and a triggered position; and
a linkage coupled to the operator notification member and to either the shank or a portion of the shear pin, the linkage holding the operator notification member in the non-triggered position when the shear pin has not failed, the linkage allowing the operator notification member to move from the non-triggered position to the triggered position when the shear pin fails.

12. The shank assembly of claim 11, further comprising a holding mechanism configured to maintain the operator notification member at the triggered position.

13. The shank assembly of claim 11, wherein the linkage is coupled between the operator notification member and the shank such that the linkage actuates the operator notification member from the non-triggered position to the triggered position as the linkage is moved by the shank as the shank pivots about the pivot joint when the shear pin fails.

14. The shank assembly of claim 11, wherein the linkage is coupled proximate a first end of the linkage to the operator notification member and proximate a second end of the linkage to a portion of the shear pin, the linkage being anchored proximate the second end of the linkage to the attachment structure when the shear pin has not failed and the linkage being no longer anchored proximate the second end of the linkage to the attachment structure when the shear pin fails.

15. A method for identifying a failed shear pin of a ground-engaging system of an agricultural implement, the ground-engaging system comprising an attachment structure coupled to a frame of the agricultural implement, a ground-engaging tool pivotably coupled to the attachment structure at a pivot joint, and a shear pin at least partially extending through the attachment structure and the ground-engaging tool, the method comprising:
receiving, with one or more computing devices, data from at least one sensor, the data being indicative of a position of an operator notification member supported on the agricultural implement, the operator notification member being movable relative to the ground-engaging tool and the attachment structure between a non-triggered position and a triggered position, the operator notification member being coupled by a linkage to the ground-engaging tool or a portion of the shear pin, the linkage holding the operator notification member in the non-triggered position when the shear pin has not failed, the linkage allowing the operator notification member to move from the non-triggered position to the triggered position when the shear pin fails;
determining, with the one or more computing devices, the position of the operator notification member based at least in part on the data indicative of the position of the operator notification member; and
controlling, with the one or more computing devices, an operation of the agricultural implement based at least in part on the position of the operator notification member.

16. The method of claim 15, wherein receiving the data from the at least one sensor comprises receiving data from a camera having a field of view that includes the operator notification member when the operator notification member is in the triggered position.

17. The method of claim 15, wherein controlling the operation of the agricultural implement comprises controlling an operation of a user interface to notify an operator of the agricultural implement when the operator notification member is in the triggered position.

18. The method of claim 15, wherein controlling the operation of the agricultural implement comprises slowing down or stopping the agricultural implement when the operator notification member is in the triggered position.

* * * * *